US010311494B2

(12) United States Patent
Karni et al.

(10) Patent No.: US 10,311,494 B2
(45) Date of Patent: Jun. 4, 2019

(54) PRINT PRODUCT DESIGNER

(75) Inventors: Zachi Karni, Givat Ella (IL); Mani Fischer, Haifa (IL); Doron Shaked, Tivon (IL); Adriane De Quevedo Cardozo, Rio Grande do Sul (BR); Randall Edward Grohs, Star, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 377 days.

(21) Appl. No.: 14/419,786

(22) PCT Filed: Aug. 16, 2012

(86) PCT No.: PCT/US2012/051167
§ 371 (c)(1),
(2), (4) Date: Feb. 5, 2015

(87) PCT Pub. No.: WO2014/028023
PCT Pub. Date: Feb. 20, 2014

(65) Prior Publication Data
US 2015/0221008 A1 Aug. 6, 2015

(51) Int. Cl.
*G06Q 30/00* (2012.01)
*G06Q 30/06* (2012.01)
*G06Q 10/10* (2012.01)
*G06Q 50/10* (2012.01)

(52) U.S. Cl.
CPC ......... *G06Q 30/0621* (2013.01); *G06Q 10/10* (2013.01); *G06Q 30/0601* (2013.01); *G06Q 30/0641* (2013.01); *G06Q 30/0643* (2013.01); *G06Q 50/10* (2013.01)

(58) Field of Classification Search
CPC . G06C 30/0601–30/0633; G06C 30/08; G06C 30/0621; G06C 30/0643; G06Q 10/10; G06Q 50/10; G06Q 30/0621
USPC ..................................... 705/26.1–27.2, 26.5
See application file for complete search history.

(56) References Cited

U.S. PATENT DOCUMENTS

| 6,992,786 B1 | 1/2006 | Breding et al. |
| 8,151,197 B1* | 4/2012 | Sulak ............... G06F 17/211 |
| | | 715/234 |
| 2005/0203809 A1* | 9/2005 | Stone ............... G06Q 10/087 |
| | | 705/7.19 |
| 2009/0234707 A1 | 9/2009 | Perez et al. |
| 2010/0100214 A1* | 4/2010 | MacDonald .......... G06F 17/248 |
| | | 700/97 |

FOREIGN PATENT DOCUMENTS

| EP | 0990962 A1 | 4/2000 |
| JP | 20020215716 A | 8/2004 |

(Continued)

OTHER PUBLICATIONS

Anonymous, Stone enhances e-business site, 2007, AC Business Media, vol. 10 Issue 2, p. 14 (Year: 2007).*

(Continued)

*Primary Examiner* — Brittney N Miller
(74) *Attorney, Agent, or Firm* — HP Inc. Patent Department

(57) ABSTRACT

A print product designer provides for selection of spatial-structural components and includes a display module to display a visual representation of a print product incorporating selected spatial-structural components.

19 Claims, 10 Drawing Sheets

(56) References Cited

FOREIGN PATENT DOCUMENTS

| KR | 10-2000-0024568 A | 5/2000 | | |
|----|-------------------|--------|---|---|
| WO | WO-9808176 | 2/1998 | | |
| WO | WO2006115350 | * 11/2006 | ............ | G06Q 99/00 |
| WO | WO-20060115350 A1 | 11/2006 | | |

OTHER PUBLICATIONS

"Bylane Overseas", Offset Printers & Packers.
"Overview of Web-to-Print Solutions", https://pressero.com/page/overview-of-web-to-print-solutions.
"Web to Print Products" http://www.webtoprintpro.com/print_on_demand_software/tabid/56/Default.aspx.

* cited by examiner

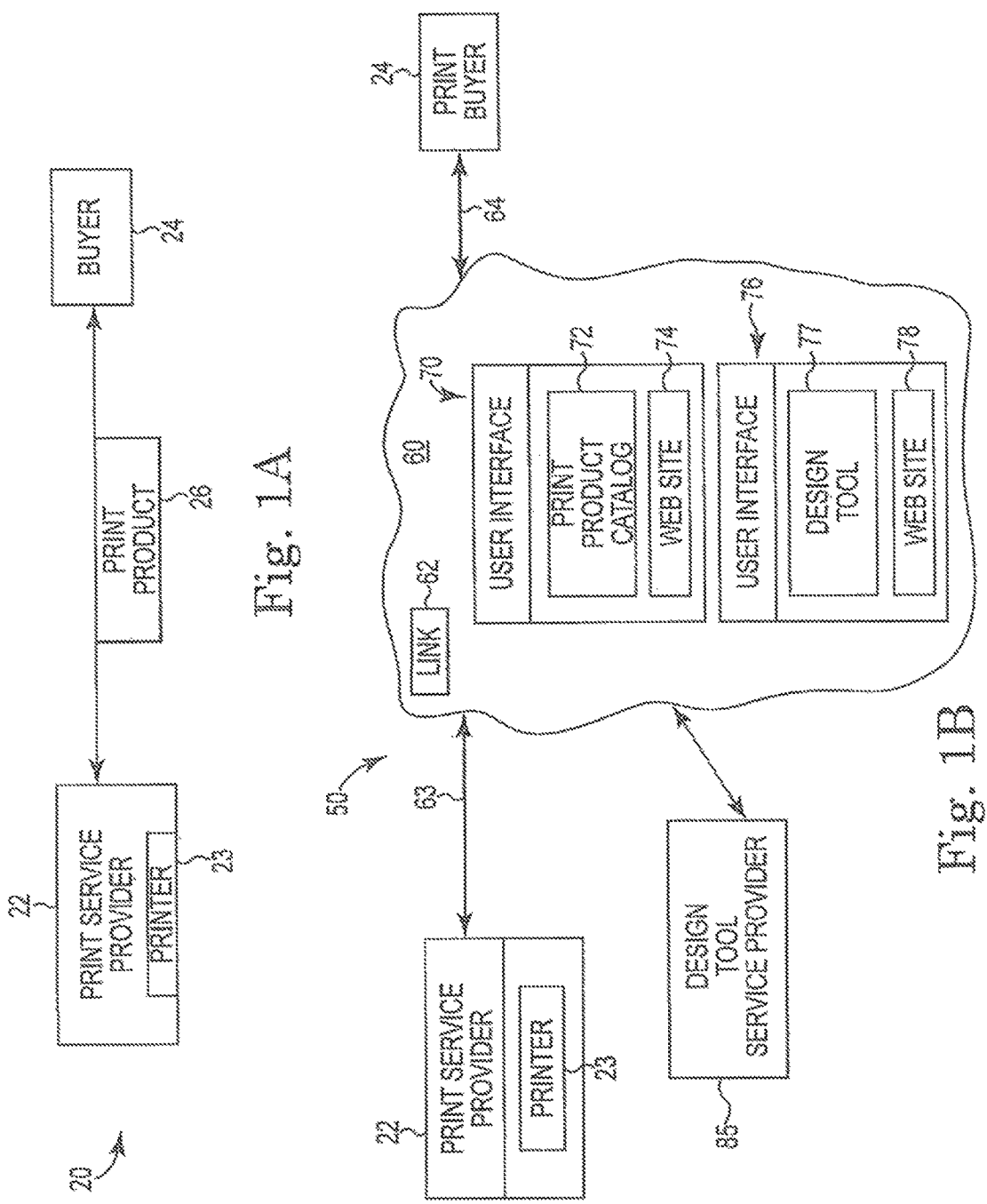

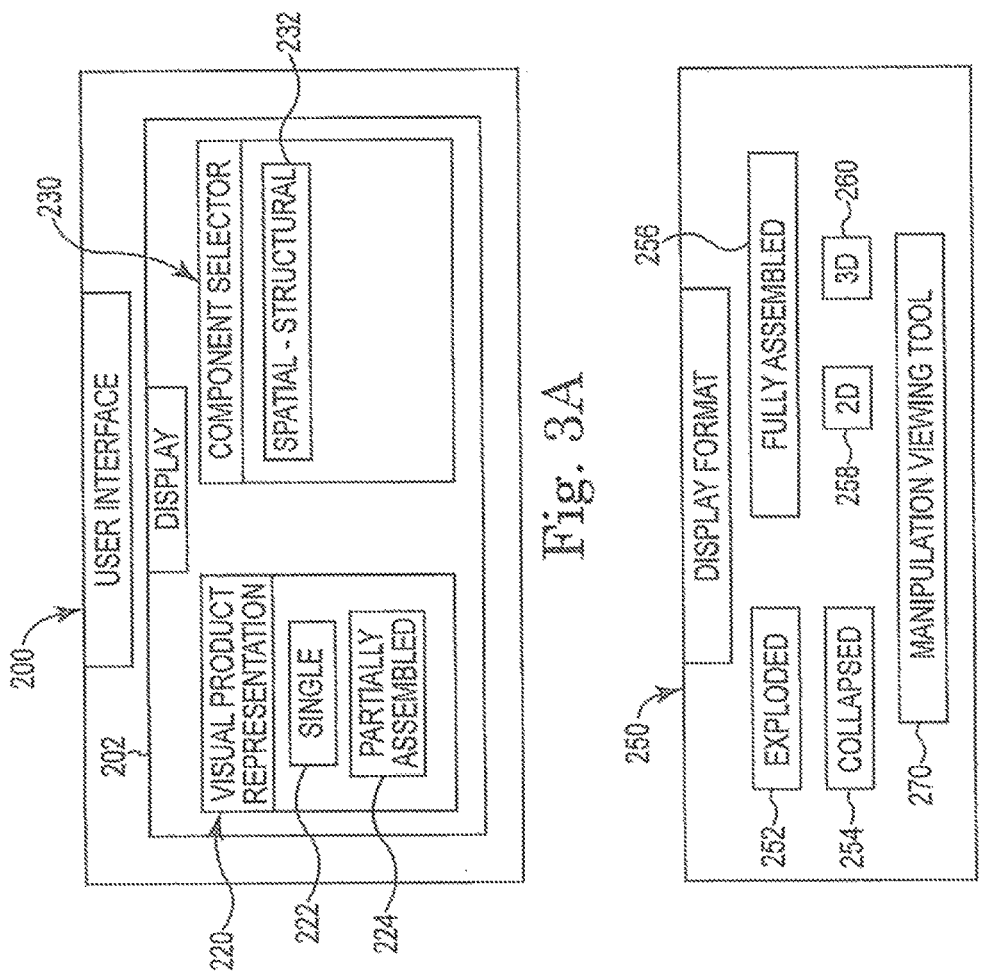

PRINT PRODUCT DESIGNER

BACKGROUND

The sale and production of print products has flourished via the electronic marketplace. Without leaving their office or home, a print buyer can easily shop via the electronic marketplace for potential print products to purchase, and upon selecting a particular print product and uploading their content, a print service provider will produce the ordered print product.

BRIEF DESCRIPTION OF THE DRAWINGS

FIG. 1A is a block diagram schematically illustrating a print product system, according to one example of the present disclosure.

FIG. 1B is a block diagram schematically illustrating a print product design system, according to one example of the present disclosure.

FIG. 2 is a block diagram schematically illustrating a server of a print product design system, according to one example of the present disclosure.

FIG. 3A is a block diagram schematically illustrating a user interface of a print product design system, according to one example of the present disclosure.

FIG. 3B is a block diagram schematically illustrating a display format module, according to one example of the present disclosure.

DETAILED DESCRIPTION

Figure 3C:
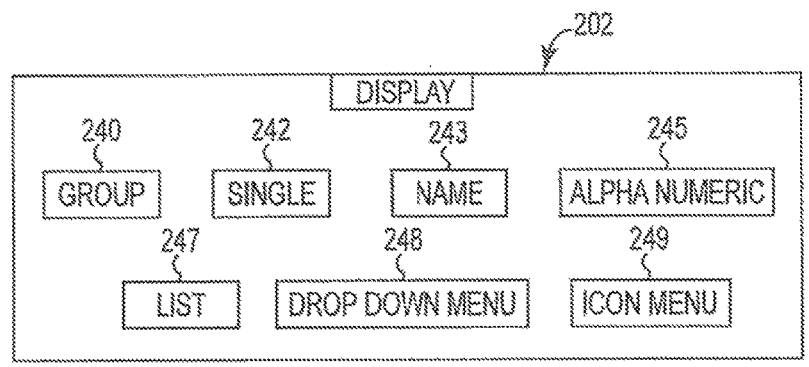
FIG. 3C is a block diagram schematically illustrating a display function for selecting spatial-structural components, according to one example of the present disclosure.

In the following detailed description, reference is made to the accompanying drawings which form a part hereof, and in which is shown by way of illustration specific examples of the present disclosure which may be practiced. In this regard, directional terminology, such as "top," "bottom," "front," "back," "leading," "trailing," etc., is used with reference to the orientation of the Figure(s) being described. Because components of examples can be positioned in a number of different or stations, the directional terminology is used for purposes of illustration, and is in no way limiting. It is to be understood that other examples may be utilized and structural or logical changes may be made without departing from the scope of the present disclosure. The following detailed description, therefore, is not to be taken in a limiting sense.

At least some examples of the present disclosure are directed to a method or system for designing a print product. In one instance, a user interface for designing a print product includes a display module and a design module. In one instance, the display module displays a three-dimensional (3D) visual representation of a print product model, which in some examples, is a visual representation of an at least partially assembled print product.

In one example, the display module additionally displays selectable spatial-structural components for print products, and in some examples, the at least partially assembled print product visible in the 3D visual representation includes at least one selected spatial-structural component. In one aspect, the design module includes a component selector function cooperative with the display to enable selection by a print service provider of the spatial-structural components.

In one example, the selectable spatial-structural components are visible to a user via a menu appearing within the user interface.

In one aspect, the design module causes each selected spatial-structural component to be incorporated into the visual representation generally simultaneous with the selection. In this way, the user interface provides immediate feedback to a designer regarding the effectiveness and appearance of the selected spatial-structural component part of the print product model.

Via this user interface, a print service provider is equipped to design a print product using a bottom-up approach in which the print service provider selects each component of the print product, as well as sets general parameters regarding the selectable properties (e.g. color, media weight, quantity, etc.) associated with each spatial-structural component that will be selectable via the user interface accessible by a print buyer. In one example, this bottom-up approach enables the print service provider to bypass the traditional, cumbersome role of engaging a professional graphic web designer when designing print products, thereby saving time and money. The print service provider is assured of achieving as high quality result via the design module, which provides a workflow of selections of components of a print product, and via the display module, which provides an immediate visual representation of the print product model being built. Moreover, the print service provider can directly offer a print buyer a wider variety of both simple and complex print products, without the high cost borne by print service providers that is typically associated with traditional, hard-coded templates for print products.

In one aspect, examples of the present disclosure effectively cause at least some of the features, attributes, and properties of a spatial-structural component to travel with the spatial-structural component and be expressed when appropriate. Accordingly, in some examples, the system need not use a separate behavior module to account for the behavior of the respective spatial-structural components. Rather, in at least some examples, these behavioral properties and/or some virtualization properties form part of the definition of the spatial-structural component. This relationship, in turn, heightens the effectiveness and speed of the bottom-up approach in examples of the present disclosure of designing a print product model from scratch on a component-by-component basis.

By employing a print product designer in accordance with examples of the present disclosure, the print service provider is no longer limited to just publishing print product offerings or just producing print products. Instead, a print service provider can design a range of print product possibilities and make them available for customization and for purchase via their own electronic marketplace presence (e.g. web site) or other electronic venue.

These examples and additional examples are described further in association with FIGS. 1-13.

FIG. 1A is a block diagram schematically illustration a print product system 20, according to an example of the present disclosure. As shown in FIG. 1A, print product system 20 includes a print service provider 22, a print buyer 24 and a print product 26. As shown in FIG. 1A, in one example, information about the print product 20 is communicated directly from the print service provider 22 to the print buyer 24 without the involvement of a third party print product designer.

In one example, a print product includes a book, magazine, booklet or pamphlet while in some other examples, a print product includes a container (e.g. a box), signage, beverage containers (e.g. a bottle), etc. Accordingly, in at least some examples of the present disclosure, a print product is not strictly limited to books and similar articles. In at least some instances, the print product exhibits some three-dimensionality in form.

FIG. 1B is a block diagram of a print product design system 50, according to one example of the present disclosure. As shown in FIG. 1B, print service provider 22 and print buyer 24 communicate with each other via cloud 60, along the respective communication paths 63, 64. In one example, the cloud 60 represents a network communication link 62 such as the internet, other network-based communication protocols, mobile telecommunication networks, local area networks (LAN), wide area networks (WAN), etc.

In one example, buyer 24 participates in system 50 via a computer (e.g. laptop, desktop, etc.), a mobile computing device (e.g. smartphone, tablet, etc.), and like devices capable of communicating via cloud 60. The buyer 24 can be an individual consumer, a business or other entity. For example, in some instances, buyer 24 is another print service provider that seeks to outsource portions of a print job (or an entire print job) for which the particular print service provider lacks the appropriate type of resources to perform and/or for which the particular print service provider does not have the capacity to handle in a particular time frame. It will be further understood that system 50 can handle multiple buyers 24 operating in parallel with each buyer 24 independently communicating with a print service provider 22 regarding their own respective purchases of print products.

In one example, print service provider 22 includes an entity owning and/or operating a print shop having printers 23 and related devices for producing a print product requested by buyer 24. In one aspect, the print services include printing, copying, finishing, assembly, delivery, shipping and related tasks. In one aspect, print service provider 22 operates a public accessible portal, such as a user interface 70 and/or web site 74 through which the buyer 24 and a print service provider 22 can communicate with each other via the cloud 60 regarding a print product 26. In particular, in one example, the user interface 70 includes a print product catalog 72 including the print products offered by the print service provider 22 and accessible by the print buyer 24 via cloud 60 for ordering.

In another example, system 60 includes a design tool 77 accessible by the print service provider 22 in user interface 76 (and/or web site 78) via cloud 60 for designing a print product. Features and aspects of the design tool 77, user interface 76, and web site 78 are further described later in association with FIGS. 2-13.

In one example, system 50 includes a design tool service provider 85 who is a third party relative to buyer 24 and relative to print service provider 22. In one aspect, design tool service provider 86 does not provide its or printing services to buyer 24. Instead, design tool service provider 85 provides and operates design tool 77 within user interface 76 (and/or we site 78), which is accessible via cloud 60 by print service provider 22. Via design tool 77, the print service provider 22 is able to design print products to be offered to print buyer 24 via catalog 72 in user interface 70 and/or web site 80, in some instances, the role of design tool service provider 85 is unknown to buyer 24 because the role played by the print product model service provider 85 is transparent to buyer 24.

In other examples, the design tool 77 and user interface 76 shown in FIG. 1B originate from the print service provider 22 and may reside with the print service provider 22 without being accessible to others via cloud 80 or web site 78. In other words, in this arrangement the design tool service provider 85 is not involved with and/or does not provide support to print service provider 22 regarding the design tool 77 used to design and publish print products 26.

With these features of system 50 in mind, it can be seen in general terms that the print buyer 24 seeks to obtain printing services from print service provider 22, such as printing of a particular print product. Based on their printing production capabilities, the print service provider 22 designs its own print products 26 and provides a catalog 72 of their print, products to buyer 24 from which the print buyer 24 can choose.

FIG. 2 is a block diagram of a server 100 associated with at least one of print service provider 22 (FIG. 1B) and/or design tool service provider 85 (FIG. 1B), according to an example of the present disclosure. As shown in FIG. 2, in one example server 100 includes a controller 102 and memory 104. In one example, memory 104 stores user interface 76, web site 78, and a manager 120.

In one example, controller 102 comprises at least one processor and associated memories to generate control signals directing operation of at least some components of system 50 of FIG. 1B and/or server 100 of FIG. 2. In particular, in response to or based upon commands received via a user interface 76 and/or machine readable instructions (including software) contained in the memory 104 associated with controller 102, controller 102 generates control signals directing operation of server 100 shown in FIG. 2. In one example, controller 102 is embodied in a general purpose computer.

For purposes of this application, in reference to the controller 102, the term "processor" shall mean a presently developed or future developed processor (or processing resources) that executes sequences of machine readable instructions (such as but not limited to software) contained in a memory. Execution of the sequences of machine readable instructions causes the processor to perform actions, such as operating server 100 to provide printing-related services by print service provider 22 and/or by design tool service provider 85 in the manner described in the examples of the present disclosure. The machine readable instructions may be loaded in a random access memory (RAM) for execution by the processor from their stored location in a read only memory (ROM), a mass storage device, or some other persistent storage or non-volatile form of memory, as represented by memory 104, in one example, memory 104 comprises a computer readable medium providing non-volatile storage of the machine readable instructions executable by a process of controller 102, in other examples, hard wired circuitry may be used in place of or in combination with machine readable instructions (including software) to implement the functions described. For example, controller 102 may be embodied as part of at least one application-specific integrated circuit (ASIC). In at least some examples, the controller 102 is not limited to any specific combination of hardware circuitry and machine readable instructions (including software), nor limited to any particular source for the machine readable instructions executed by the controller 102.

In one example, user interface 76 comprises a graphical user interface or other display that provides for the simultaneous display, activation, end/or operation of the various components, functions, features, and modules of sewer 100, described in association with at least FIG. 2, and/or operation of the various components, functions, features, and modules of user interface 200 or 300, as later described in association with at least FIGS. 3A and 4, respectively. Moreover, it will be understood that the features, functions, modules, and components of the server 100 can be arranged in different forms end groupings, and therefore server 100 is not strictly limited to the particular arrangement or groupings of features, functions, components, and/or modules illustrated in FIG. 2. Similarly, while described later it will be further understood that the features, functions, modules, and components of the example user interface 200 (FIG. 3A) or the example user interfaces 300 (FIG. 4) can be arranged in different forms and groupings, and therefore each user interface 200, 300 is not strictly limited to the particular arrangement or groupings of functions illustrated in FIGS. 3A and 4, respectively.

In one example, user interface 70 comprises substantially the same features and attributes as user interface 76, except for providing print product catalog 72 for access by print buyer 24 instead of providing design tool 77 for access by print service provider 22.

With reference to FIGS. 1B and 2, in one example web site 74 comprises a site operated by print service provider 22 and accessible by at least print buyer 24, through which user interface 70 can be accessed. However, in other examples, user interface 70 is supplied via CD-ROM or communication protocols and/or environments other than web site 74.

While in one example the features, function, modules, and/or components of a print service provider 22 and/or design tool service provider 85 are at least partially embodied in a server (e.g. server 100) as described in association with FIG. 2, it will be understood that in another example of the present disclosure, at least some of the features, functions, modules, and/or components of the print service provider 22 and/or design tool service provider 85 are provided via the cloud 60 via cloud computing resources provided via: (1) infrastructure as a service (IaaS); (2) platform as a service (PaaS); (3) software as a service (SaaS); or (4) a hybrid form of cloud-based services.

With further reference to FIGS. 1B and 2, in one example web site 78 comprises a site operated by design tool service provider 85 and accessible by at least print service provider 22, with web site 78 hosting the user interface 76 to be accessed. In one example, print service provider 22 also contracts with design tool service provider 85 to make user interface 70 and/or web site 74 available to print buyer 24 so that print service provider 22 can provide the catalog 72 of print products, from which buyer 24 can choose and customize, and then request production of the print product by print service provider 22.

With further reference to FIG. 2, in some examples, at least some portions of the print products in the catalog 72 are content-free or blank in that no text or graphics are present on the pages or covers. In other examples, at least some portions of the print products listed or shown in the catalog 72 include a portrayal of sample content that is not specific to the print buyer 24. However, once buyer selects a print product from catalog 72 and the buyer 24 uploads its content into the print product 26, then the user interface 70 and/or web site 74 will display the print product in a form that incorporates the content of the buyer 24.

In some examples, server 100 includes a manager 120 (stored in memory 104) that operates in association with user interfaces 70 or 76, respectively, to regulate the interaction and relationship between print service provider 22 and buyer 24 or between print service provider 22 and design tool service provider 85, respectively.

In one example manager 120 includes a design too module 130 to provide print service provider 22 a vehicle by which to design and publish their own print product models in the electronic marketplace. Further details regarding operation of the design tool module 130 are described in association with at least FIGS. 3A-10B and 13.

In another example, manager 120 includes a catalog module 140 to provide print buyer 24 a way to access the print products offered by the print service provider 22. As shown in FIG. 2, catalog module 140 makes a catalog accessible, to print buyers 24 that is unique to the print products offered by a first print service provider (PSP 1) 142 or unique to the print products offered by a second print service provider (PSP 2) 144. In another example, catalog module 140 makes a general catalog 146 accessible to print buyers 24 that includes print products available from multiple print service providers.

It will be understood that examples of the present disclosure may in some instances refer to designing a print product as building a print product because the design of the overall print product occurs in an iterative fashion in which the design is "built" by successively adding several spatial-structural components together until an assembled form is constructed and displayed as a visual representation of a print product. However, an actual print product will not be physically constructed until a buyer places a print order and the print service provider uses their printers and associated devices to physically produce the print product. Accordingly, in the context of the examples of the present disclosure, the description of building a print product is made with respect to constructing a print product model which is depicted via the visual representation shown in the display portion of a user interface (e.g. user interface 300 in FIG. 4).

FIG. 3A is a block diagram of a user interface 200, according to one example of the present disclosure, in one example, use interface 200 includes at least substantially the same features and attributes as user interface 76 as previously described in association with FIGS. 1B-2. As shown in FIG. 3A, user interface 200 comprises a display module 202 including a visual product representation function 220 and a component selector function 230. In one example, the display module 202 forms a portion of the design toot module 130 of FIG. 2.

In general terms, the component selector function 230 enables a user (e.g. a print service provider 22) to select a spatial-structural component 232 via display module 202 as part of constructing a print product model. In some examples, the spatial-structural component 232 is selected from a plurality of spatial-structural components, which are shown as a group 240 or one-at-a-time (i.e. single 242) via a data field visible in display module 202, as shown in FIG. 3C. In some examples, these selectable spatial-structural components selectable via display module 202 are identified by a name 243 or other alphanumeric identifier 245, as further shown in FIG. 3C.

As further shown in FIG. 3C, in other examples, the spatial-structural components selectable via the display module 202 are displayed in a list 247, a drop-down menu 248, or an icon menu 249 including icons visible in the display module 202 with each icon corresponding to each respective selectable spatial-structural components. One example of a menu 320 of icons, which represent selectable spatial-structural components, is described and illustrated later in association with FIG. 4. With further reference to FIG. 3A, in general terms, the visual product representation function 220 of display module 202 displays a visual representation of the print product, as further illustrated later in association with FIG. 5A. In at least some examples, the visual representation depicts at least a single spatial-structural component 222 of a print product. In one aspect, the single spatial-structural component 222 is based on a selection made by the print service provider 22 via the previously described component selector function 230.

In one example, the visual product representation function 220 visually depicts a partially assembled print product. As additional spatial-structural components are selected by a print service provider 22 for inclusion into a design of a print product, these additional spatial-structural components are shown as part of the partially assembled print product. In other words, upon the occurrence of each selection, the selected spatial-structural component is incorporated into the visual representation of the partially assembled print product. Accordingly, at any given point in time, the visual product representation function 220 incorporates all the selected spatial-structural components into a single visual graphic model, i.e. a print product model.

FIG. 3B is a block diagram of a display format function 250, according to an example of the present disclosure. In general terms, the display format function 250 is part of the display module 202 (FIG. 3) or the underlying design module 130 (FIG. 2), and controls the manner by which the visual representation function 220 in display module 202 visually depicts the print product. In one example, as shown in FIG. 3B, the display format function 250 includes an exploded view parameter 252, a collapsed view parameter 254, a fully assembled view parameter 250, a two-dimensional (2D) view parameter 258, a three-dimensional (3D) view parameter 260, and a manipulation viewing tool 270.

In one instance, the exploded view parameter 252 causes the spatial structural components of the print product to appear within the display in an exploded format by which the various spatial-structural components are spaced apart from other each other to show each spatial-structural component in its entirety, but with the respective components in general alignment in the manner in which they would be joined together. In one example, as the print product 26 is being built on a component-by-component basis via a series of selections by the print service provider, the partially assembled print product is shown (in display module 202) by default in the exploded format (via exploded view parameter 252) to ensure clarity about which components are included in the under-construction print product, what order they will be joined together, how they are aligned, etc.

In another instance, the collapsed view parameter 254 causes the already-selected spatial-structural components to be displayed as if they are already joined together despite not all the spatial-structural components being selected to form a complete print product. In other words, the spatial-structural components are collapsed together (from their exploded position in the exploded view) into an assembled form. In one example, the fully assembled view parameter 256 causes the print product to be displayed in its complete form when all spatial-structural components have been selected and joined together.

In another example, the two-dimensional (2D) view parameter 258 causes the display to show a spatial-structural component and/or the entire print product in a two-dimensional format, such as a top plan view or side elevational view. On the other hand, the three-dimensional (3D) view parameter 260 causes the display to show a particular spatial-structural component and/or the entire print product in a three-dimensional format, such as a perspective or isometric view. In one example, as shown in FIGS. 4 and 7-9, the display module 202 operates by default in the three-dimensional format when the print product model is being built on a component-by-component basis.

In one example, display format function 250 includes a manipulation viewing tool 270, which enables manipulating the displayed view of a spatial structural component, a partially assembled print product model, or a fully assembled print product model. In some instances, such manipulations include actions such as rotating, magnifying, elevating, etc. the displayed components or product. In other instances, the manipulation viewing tool 270 enables display module 202 to temporarily omit a previously-included spatial-structural component to enable evaluating the appearance of the print product without that component.

Figure 4:
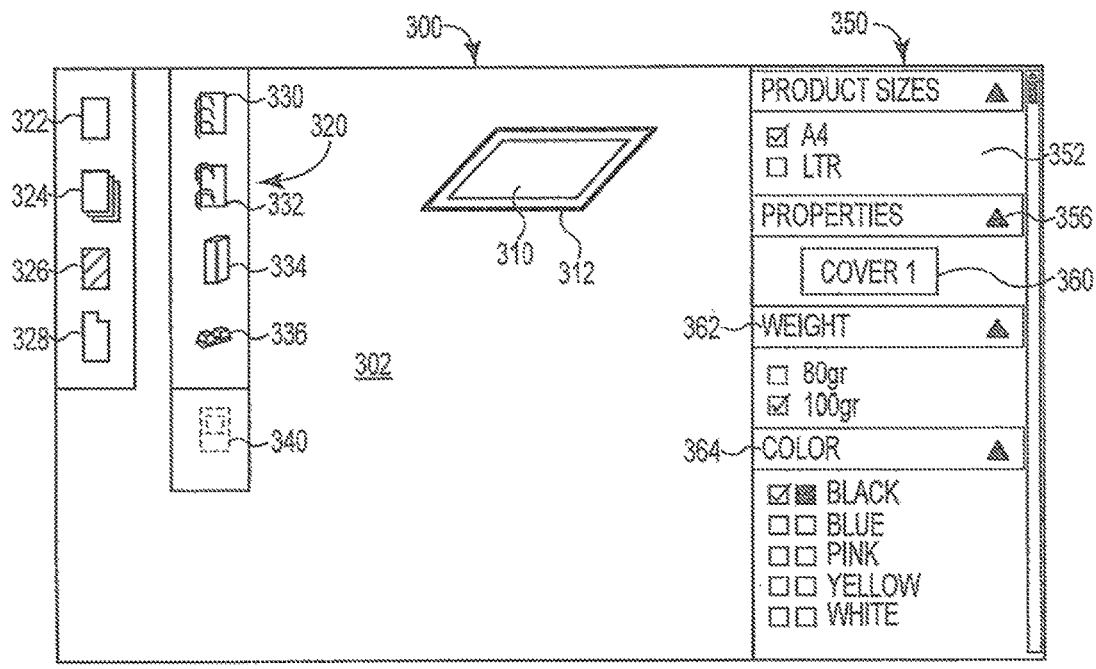
FIG. 4 is a diagram schematically illustrating a user interface, including a display portion and an input portion, according to one example of the present disclosure.

FIG. 4 is a diagram schematically illustrating a user interface 300, according to one example of the present disclosure. In one example, user interface 300 includes or incorporates at least substantially the same features and attributes as user interface 200 previously described in association with FIG. 3A. As shown in FIG. 4, user interface 300 includes a display portion 302 and input portions 320, 350. In addition, while not shown in FIG. 4, it will be understood that prior to building a product at user interface 300, a viewer can access a product list identifying previously-constructed print products, which can be reviewed or modified.

As shown in FIG. 4, display portion 302 provides a visual representation of one selected spatial-structural component such as a cover 310 which is highlighted via pointing tool 312. In one example, input portion 320 takes the form of a menu including an array of icons 322346 corresponding to selectable spatial-structural components. It be understood that other icons can be used and that the user interface 30 is not strictly limited to the spatial-structural components represented by icons 322-340. In other examples, the menu of input portion 320 provides a list of names for other alphanumeric identifier) with each listed name (or alphanumeric identifier) corresponding to one of the selectable spatial-structural components, in a manner similar to that previously described in association with FIGS. 3A and 3C.

With further reference to the menu of it portion 320 in FIG. 4, in one example page icon 322 represents a single page while page stack icon 324 represents a stack of pages. Cover icon 326 represents a cover while separator icon 328 represents a separator. First spiral icon 330 and second spiral icon 332 represents different spiral bindings. Perfect bound icon 334 represents a perfect bound binding and icon 336 represents other types of bindings. Dashed window icon 340 represents a window-type cover.

By using a pointing tool to select one of the icons, the user can select a spatial-structural component for inclusion into the print product model. As shown in FIG. 4, the user already has used cover icon 326 to select a first cover for the print product such that a visual representation of a cover 310 appears in the display portion 302.

Before proceeding with a further illustration and description (in association with at least FIGS. 7-9) of a workflow in which a user is guided to make a series of selections of spatial-structural components to design a print product model, a further illustration and description of aspects of the design module 130 that drives the workflow expressed via the user interface 300 (FIG. 4) will be made.

Figure 5A:
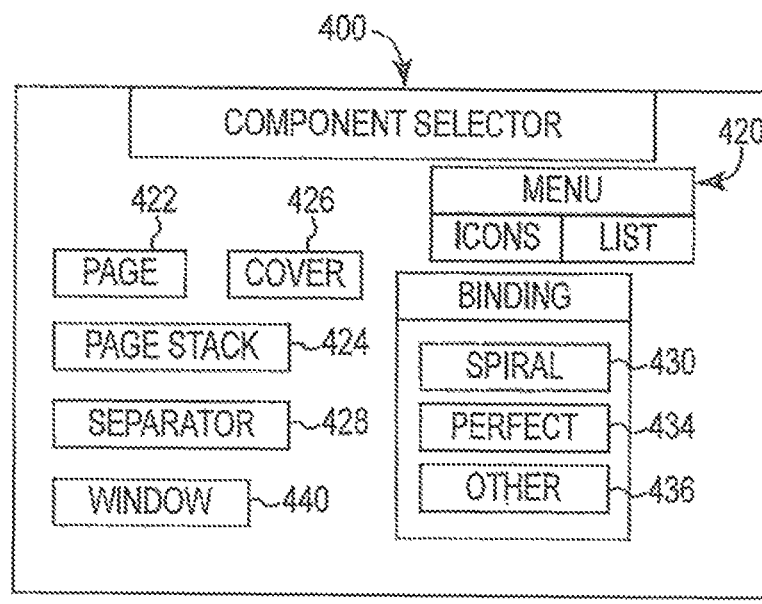
FIG. 5A is a block diagram schematically illustrating a component selector module, according to one example of the present disclosure.

With this in mind, FIG. 5A is a block diagram schematically illustrating a component selector module 400, according to an example of the present disclosure in general terms, the component selector module 400 supports operation of user interface 300 to enable a user (e.g. a representative of print service provider 22) to select spatial-structural components for inclusion into a print product. As shown in FIG. 5A, component selector module 400 includes a menu 420 of selectable spatial-structural components which are provided via icons and/or a list, in a manner substantially similar to the menu of input portion 320 previously described and illustrated in association with FIG. 4. In one example, some of the selectable spatial-structural components include a page 422, a cover 426, a page stack 424, a separator 428, and a window 440. In another example, a print product includes a binding component (as one of the spatial-structural components) and therefore component selector module 400 includes a binding selector function 431 that includes selectable binding components, such as but not limited to, a viral binding 430, a perfect bound binding 434, and other bindings 438.

In some examples, fewer or more spatial-structural components are available for selection than those shown for the component selector module 400 in FIG. 5A.

Figure 5B:
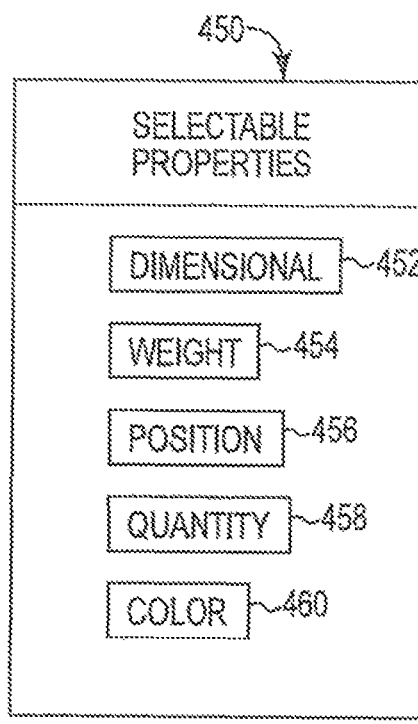
FIG. 5B is a block diagram schematically illustrating a selectable properties module, according to one example of the present disclosure.

FIG. 5B is a block diagram schematically illustrating a selectable properties module 450, according to an example of the present disclosure. In general terms, the selectable properties module 450 governs which properties of a spatial-structural component that a user may select or deselect during the building of a print product model. Moreover, the type and number of selectable properties available for selection at any given time depend on which type of spatial-structural component has been selected. These selectable properties stand in contrast to non-selectable properties, which are described later relative to module 470 in association in at least FIG. 6A.

In one example, the selectable properties module 450 includes a dimensional parameter 452, a weight parameter 454, a position parameter 456, a quantity parameter 458, and a color parameter 460. The dimensional parameter 452 enables selecting or adjusting the dimensions of the selected spatial-structural component while the weight parameter 454 enables selecting a weight of media associated with the particular spatial-structural component. The position parameter 456 enables selecting or adjusting the position of a feature of a spatial-structural component or selecting or adjusting the position of one spatial-structural component relative to another spatial-structural component. The quantity parameter 458 enables selecting or adjusting a quantity, such as the number of pages in a page stack. The color parameter 460 provides a list of selectable colors for a particular spatial-structural component.

As shown in FIG. 4, a cover 310 is the selected spatial-structural component and therefore, user interface 300 (as guided by selectable properties module 450) automatically provides in input portion 350 the applicable selectable properties for a cover. Accordingly, in this instance, item function 360 of input portion 350 displays which type of spatial-structural component (e.g. Cover 1) is under consideration. Input portion 350 further displays selectable media weights (e.g. 80 gram, 100 gram) via weight parameter 454 (FIG. 5B) and displays selectable colors (e.g. black, blue, etc.) via color parameter 460 (FIG. 5B) for this type of cover.

In one example, when a page is selected for inclusion into the print product, a substantially similar set of selectable properties (e.g. weight, color) are provided for selection for the page via input portion 350.

Providing such selectable properties in direct association with a spatial-structural component, in accordance with at least some examples of the present disclosure, avoids the labor and time intensive traditional approach of having to provide a separate hard-coded template for each instance of a spatial-structural component the expresses variable properties. For instance, under a traditional approach, if a spiral binding were available in three different radii, then a separate hard-coded template would have to be provided for each different radii spiral binding. However, via the arrangement in examples of the present disclosure, there is no need for three separate hard-coded templates, because the different selectable radii associated with the particular spatial-structural component form part of the definition of that spatial-structural component, according to the design module (e.g. design module 130 in FIG. 2) that defines the parameters of the various selectable spatial-structural components.

Figure 6:
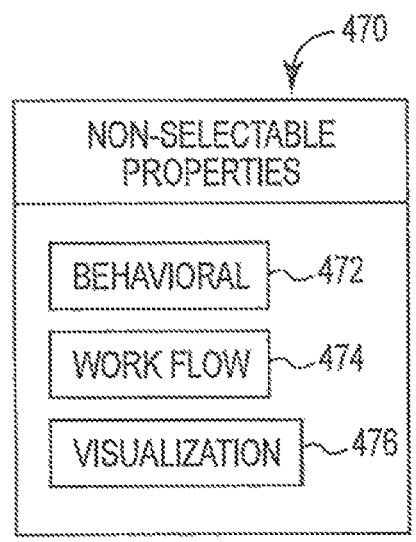
FIG. 6 is a block diagram schematically illustrating a non-selectable properties module, according to one example of the present disclosure.

As part of directing the workflow experienced by the print service provider 22 via user interface 300 FIG. 4) and driven by design module 130, design module 130 also governs non-selectable properties associated with the spatial-structural components of a print product. Accordingly, as shown in FIG. 6, a non-selectable properties module 470 includes a behavioral parameter 472, a workflow parameter 474, and a visualization parameter 476. The behavioral parameter 472 tracks and determines how a particular spatial-structural component relates to other spatial-structural components, including which ways the spatial-structural components can be grouped together, aligned together, secured together, etc.

In one aspect, the workflow parameter 474 tracks and determines in what sequence particular spatial-structural components can be combined, as well as determining an overall workflow, such as whether a viewer is guided to select a cover first or to select a cover later in the process of building a print product. Similarly, the workflow parameter 474 determines whether some items such as separators are to be inserted after all the other spatial-structural components have been selected or whether the separators are to be selected in between the selection of adjacent pages or page stacks.

The visualization parameter 476 tracks and determines what visual effects result from the selections made in the selectable properties for a particular spatial-structural component or result from which spatial-structural component was selected (as opposed to another type of spatial-structural component). In other words, for each visual feature of a spatial-structural component, the visualization parameter 476 automatically determines and implements how the respective visual features will be portrayed in the display portion 302 of user interface 300 (FIG. 4) as part of the visual representation of the print product (or its constituent components).

In some examples, design module 130 (FIG. 2) defines virtuatization properties or visualization properties for a particular spatial-structural component (e.g. cover, binding etc.) of a print product. For instance, when a spiral binding comprises one of the spatial-structural components, the spiral binding will have a particular pitch, diameter, etc and may have particular finish characteristics (gloss vs. matte), which are written into the definition for the spiral binding provided for that spatial-structural component via the design module 130 (FIG. 2). These characteristics are also trackable via visualization parameter 476 of the non-selectable properties module 470 of FIG. 6A. Similar examples of a virtualization property or visualization property would be the reflectance associated with a particular finishing feature, such as varnish. By writing the reflectance behavior into the definition of the finishing component, the behavior travels with the print product entity so upon selection and inclusion of that print product entity into the print product, the behavior (e.g. reflectance) automatically becomes part of the visual representation of the print product and is not something that needs to be added later to create an accurate rendering of a print product model.

Figure 7:
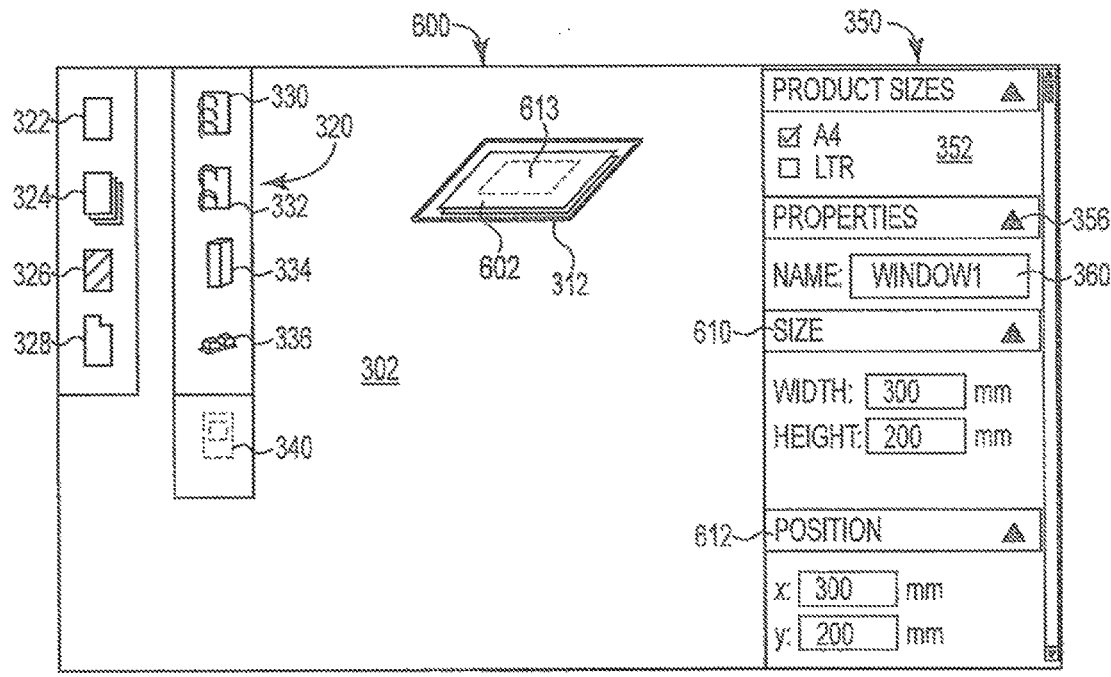
FIG. 7 is a diagram schematically illustrating a used interface, including a display portion and an input portion, according to one example of the present disclosure.
Figure 8:
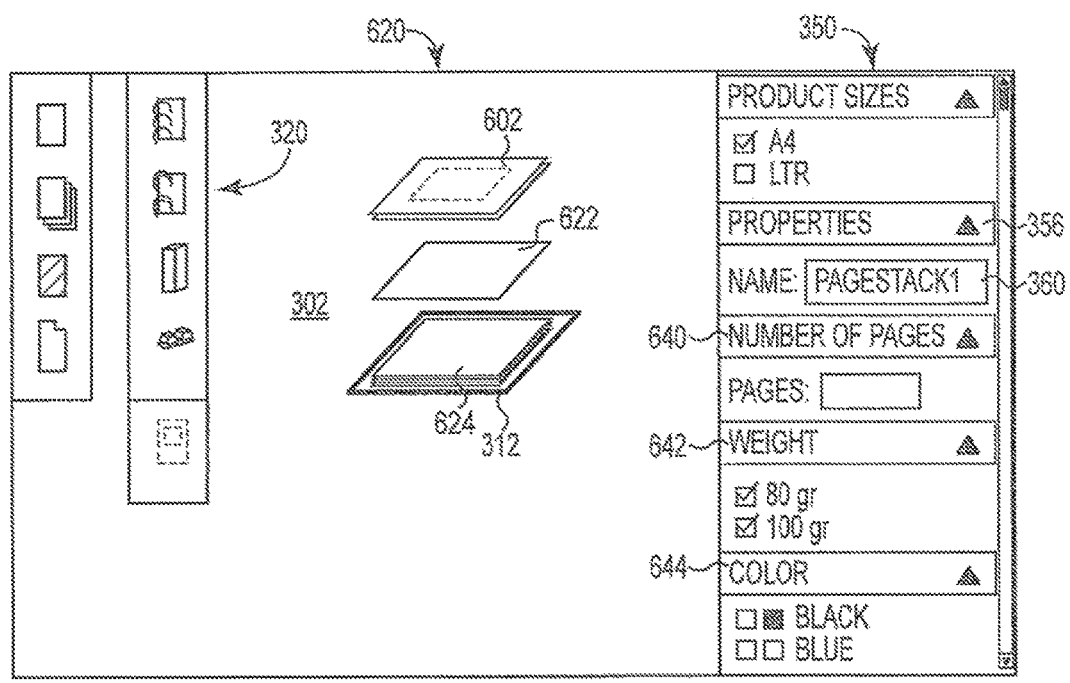
FIG. 8 is a diagram schematically illustrating a user interface, including a display portion and an input portion, according to one example of the present disclosure.
Figure 9:
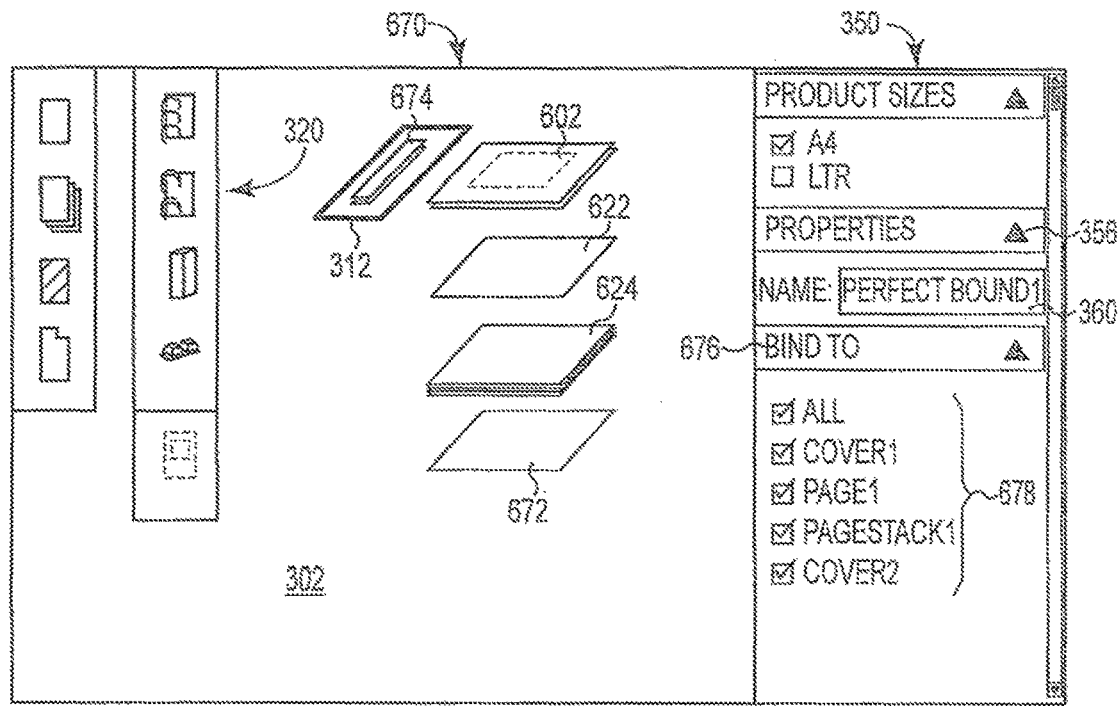
FIG. 9 is a diagram schematically illustrating a user interface, including a display portion and an input portion, according to one example of the present disclosure.

With this understanding in mind, reference is made to FIGS. 7-9 to resume discussion of the workflow of selecting spatial-structural components to build a visual representation of a print product, i.e. a print product model.

FIG. 7 is a diagram schematically illustrating a user interface 600 of a print product design system, according to an example of the present disclosure. The user interface 600 comprises substantially the same features and attributes as user interface 300 (FIG. 4), except for displaying a different selected spatial-structural component and having a different set of selectable properties. As shown in FIG. 7, the display portion 302 includes a visual representation of a window-type cover 602 (i.e. the selected spatial-structural component) that the user selected via icon 340 of menu 320. The input portion 350 retains the A4 size designation and the Properties section 356 indicates via status field 360 that Window1 is the type of spatial-structural component currently selected. In this example, the selectable properties include a dimensional parameter 610 regarding the size of the window 613 and a position parameter 612 regarding the relative position of the window 613.

FIG. 8 is a diagram schematically illustrating a user interface 620 of a print product design system, according to an example of the present disclosure. The user interface 620 comprises substantially the same features and attributes as user interface 600 (FIG. 7), except for displaying additionally selected spatial-structural components and having a different set of selectable properties for the most recently selected spatial-structural component. As shown in FIG. 8, the display portion 302 includes a visual representation of a partially assembled print product including a window-type cover 602, a page 622, and a page stack 624, which is the currently selected spatial-structural component and which was selected via icon 324 of menu 320.

By showing the window-type cover 602, page 622, and page stack 624 aligned with each other relative to an expected binding and arranged in the order in which they would be assembled together, display portion 302 provides a visual representation of an at least partially assembled print product with those respective spatial-structural components.

As further shown in FIG. 8, the input portion 350 retains the A4 size designation and the Properties section 356 indicates via status field 360 that PageStack1 is the type of spatial-structural component currently selected. In this example, the selectable properties include a quantity parameter 640 regarding the number of pages in the stack, a weight parameter 642 regarding the weight at the media, and a color parameter 644 regarding the selectable colors for the page stack.

FIG. 9 is a diagram schematically illustrating a user interface 670 of a print product design system, according to an example of the present disclosure. The user interface 670 comprises substantially the same features and attributes as user interface 620 (FIG. 8), except for displaying additionally selected spatial-structural components and having a different set of selectable properties for the most recently selected spatial-structural component. As shown in FIG. 9, the display portion 302 includes a visual representation of a partially assembled print product including a window-type cover 502, a page 622, a page stack 624 cover 672, and perfect bound binding 674, which is the currently selected spatial-structural component and which was selected via icon 334 of menu 320.

As further shown in FIG. 9, the input portion 350 retains the A4 size designation and the Properties section 356 indicates via status field 360 that PerfectBound1 is the type at spatial-structural component currently selected. In this example, the selectable properties include a binding designation 676 to specify which spatial-structural components in group 678 are to be bound by the selected binding 674. Because all the components listed in group 678 are selected, they all will be bound together via binding 674.

Figure 10A:
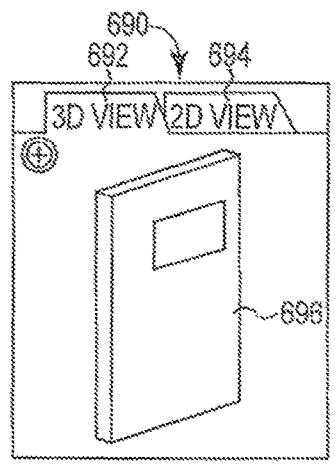
FIG. 10A is a diagram schematically illustrating a portion of a user interface with a three-dimensional view of a print product, according to one example of the present disclosure.
Figure 10B:
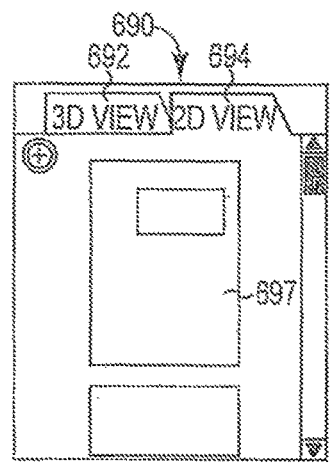
FIG. 10B is a diagram schematically illustrating a portion of a user interface with a two-dimensional view of a print product, according to one example of the present disclosure.

FIG. 10A and FIG. 10B are diagrams schematically illustrating visual representations of a fully assembled print product 696, according to an example of the present disclosure. In one example, FIG. 10A is an additional window 690 of a user interface (e.g. user interface 670) that complements the visual representation of a partially assembled print product shown in display portion 302. As shown in FIG. 10A, window 690 includes 3D View tab 692 and 2D View tab 694 with FIG. 10A showing print product 696 in a perspective view to reveal a three-dimensional appearance of the print product. Conversely, as shown in FIG. 10B, window 690 shows print product 696 in a top plan view of a front cover of the print product.

In some examples, either the view shown in FIG. 10A or the view shown in FIG. 10B of a fully assembled print product 698 is magnified and displayed in display portion 302 of a user interface (e.g., user interface 670) instead of the previously displayed partially assembled print product shown in FIG. 9.

Via the user interfaces, such as user interface 670 of FIG. 9, the print service provider 22 can review the various properties and appearance of the complete print product model and make any desired adjustments. Once the viewer is satisfied with the design of the print product model, then the workflow (driven by design module 130) directs the print service provider to publish the print product model in catalog 72 (FIG. 1B) that is accessible by a print buyer 24 and selectable, for purchase by buyer 24 (to result in its production by the print service provider 22).

Figure 11:
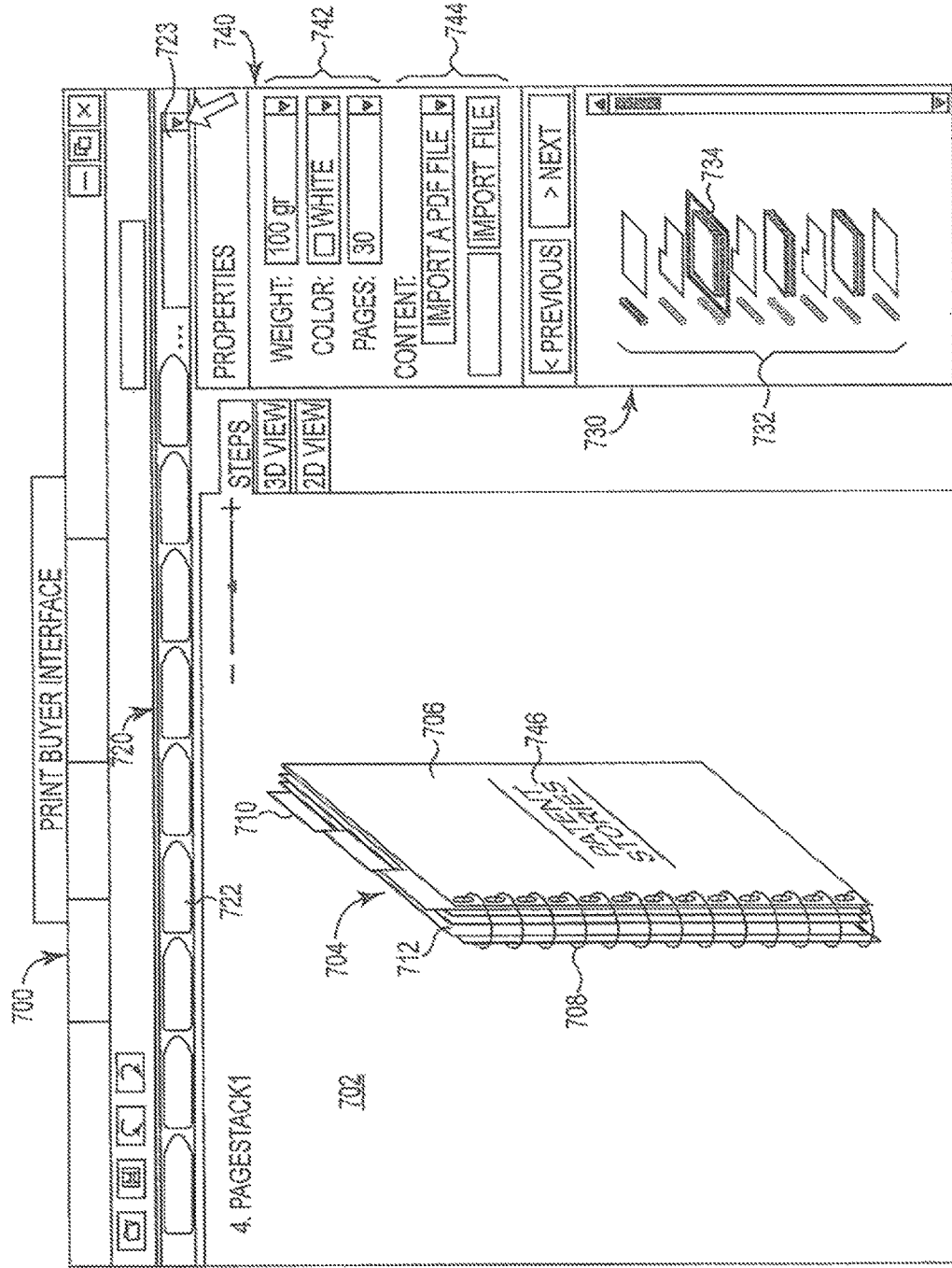
FIG. 11 is a diagram schematically illustrating a user interface accessible by a print buyer, including a display portion and an input portion, according to one example of the present disclosure.

Assuming that print buyer 24 accesses the catalog 72 of published pint products 26 available from the print service provider 22, the print buyer 24 will have an opportunity to apply a top-down approach to review and/or adjust a print product offered by the print service provider 22. With this in mind, FIG. 11 is diagram schematically illustrating a print buyer user interface 700 according to an example of the present disclosure. In one example, user interface 700 includes at least substantially the same features and attributes as user interface 70, as previously described and illustrated in association with FIG. 1B.

As shown in FIG. 11, user interface 700 includes a display portion 702 by which a three-dimensional visual representation of a print product 704 is viewable by a print buyer 24. The print product 704 includes, among other features, a front cover 706, a spiral binding 708, separators 710, and pages or page stacks 712. As apparent from FIG. 11, the print buyer 24 views the print product 704 in its fully assembled form and has the opportunity to select a specific spatial-structural component (e.g. a page stack 712) for which properties can be adjusted.

Moreover, user interface 700 permits the print buyer 24 to change some global properties that do not negatively affect the print product 704. For example, the print buyer 24 can change from A4 size to a US Letter size without otherwise negatively affecting the other aspects of the print product.

For any change (e.g. different color cover) may by print buyer 24 to a property affecting the print product 704, the display portion 702 of use interface 700 automatically displays a modified visual representation of the print product 704 to visually express the changed properties (showing a blue cover instead of an originally designated red cover).

As further shown in FIG. 11, user interface 700 includes a selection portion 30 to select which spatial-structural component (e.g. page stack icon 734) in the set 732 of components is currently activated and therefore subject to modification. In one aspect, the selection portion 730 provides a visual representation (via an exploded view) of all the spatial-structural components comprising the print product to allow the buyer 24 to view every aspect of individual components of the print product.

Moreover, as further shown in FIG. 11, user interface 700 includes a properties selection portion 740 including a media properties portion 742 and a content portion 744. In the media properties portion 742, the user interface 700 identifies the weight of the media in page stack 712, a media color of page stack 712, and a quantity of pages in the stack 712. In addition, the media properties portion 742 also provides pull down menus or data fields to adjust a value of those respective properties. Upon changing a value of any one of these parameters in properties selection portion 742, a corresponding change in the visual representation of print product 704 will occur in display portion 702 that is generally simultaneous with the adjustment in properties selection portion 742.

In some examples, via content portion 744 of the user interface 700, a print buyer 24 is able to upload their content onto the page stack 712 to see how the print product 704 will appear with the actual content that would be included in the physical print product to be produced by the print service provider 22. In one words, by providing this "streaming" option in which the buyer 24 uploads their content (e.g. "import a pdf file"), the print service provider 22 equips the buyer 24 to interact with their content in a highly accurate simulation of the print product they are considering to purchase.

In one example, such uploaded content includes a title 706 of a print product model, as shown in FIG. 11.

If the print buyer 24 likes the appearance of the print product model that includes the uploaded content, the user interface 700 enables the print buyer 24 to save and publish the content-laden print product as part of the buyer's purchase of the print product. In this way, assuming that the print buyer 24 is satisfied with the purchased print product, they need not later re-upload their content to order the print product from the print service provider 22.

Figure 12A:
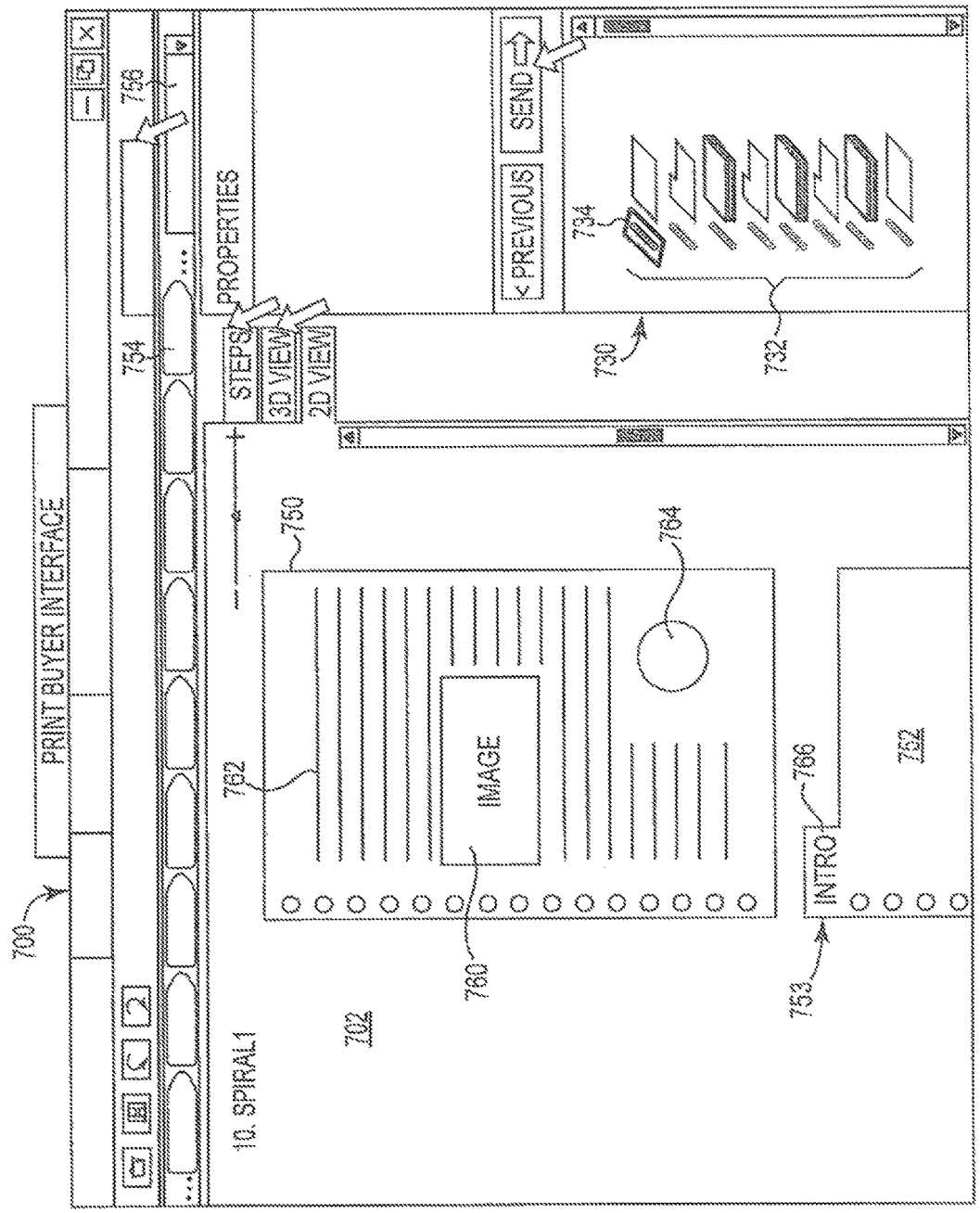
FIG. 12A is a diagram schematically illustrating a user interface accessible by a print buyer, including a display portion and an input portion, according to one example of the present disclosure.

FIG. 12A is a diagram schematically illustrating a user interface 700 having substantially the same features and attributes as user interface 700 of FIG. 11, except that FIG. 12A illustrates some individual spatial-structural components, such as page 750 and separator 752, instead of showing the fully assembled print product 704 displayed in FIG. 11.

In one example, FIG. 12A reflects the action of print buyer 24 to more closely inspect the individual spatial-structural components (e.g. 750, 752) of the print product 704. In this instance, the buyer 24 is examining the behavior properties associated with the spiral binding (see notation "Spiral 1" in the display portion 702), such as the position, spacing, and number of holes 754 in page 750 and of holes 754 in separator 752 that are dictated by selection of a particular type of binding. In some examples, selectable data field 756 corresponds to and also displays the notation (e.g. "Spiral 1") appearing in display portion 702 because the selectable data field 756 provides one mechanism for identifying the component (e.g. a spiral binding) to be reviewed in display portion 702. However, data field 756 is shown blank in FIG. 12A for illustrative simplicity.

Once the print buyer 24 is satisfied with their customization of the buyer-selectable properties of the various spatial-structural components, the buyer can save the modified print product model and send a request to have the print service provider 22 produce the selected and modified print product model.

FIG. 12A also provides further examples of the visibility of a user's uploaded content as incorporated into a print product model. As demonstrated via at least the example shown via FIG. 12A, the user's content is made visible in user interface 700 so that as user (such as a print buyer) will be able to view their content in the context of a visual representation of the print product model. Accordingly, in one example, a user's uploaded content appears on a page 750, as shown in FIG. 12A. In this instance, the content includes image 760, text 762, and/or graphic 764.

Figure 12B:
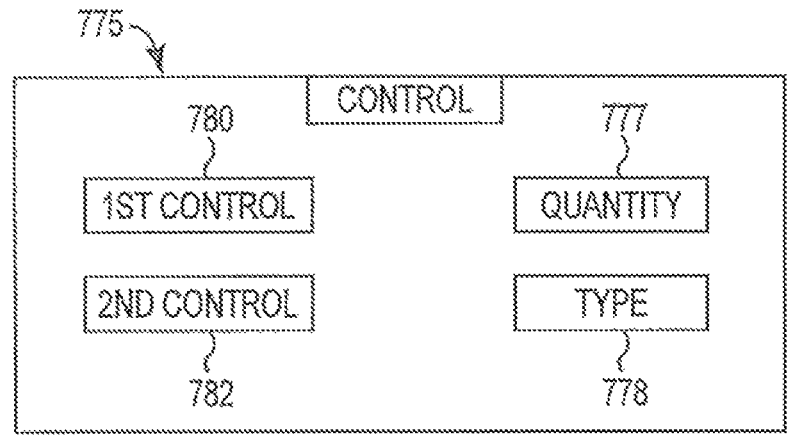
FIG. 12B is a block diagram schematically illustrating a control module, according to one example of the present disclosure.

FIG. 12B is a block diagram schematically illustrating a control function 775, according to one example of the present disclosure. As shown in FIG. 12B, the design module 130 (FIG. 3) includes a control function 775 having a first control parameter 780 to control to at least one of a number 777 and a type 778 of the selectable properties of the selectable properties function 450 (FIG. 5B) and a second control parameter 782 to control a subset of the respective number and type of properties controlled via the first control parameter 780. In one example, the design tool service provider 85 (FIG. 1B) exercises control via the first control parameter 780 to determine which properties are selectable by a print service provider 22 while the print service provider 22, in turn exercises control via the second control parameter 782 to determine which properties are selectable by a print buyer 24 (from user interface 70 that offers print products from the print service provider 22).

With this arrangement in mind, it will be understood that in one example of the present disclosure, the user interface made available by a design tool provider 85 to print service provider 22 (e.g. user interface 300 in FIG. 4) allows multiple items (e.g. back, blue, pink, etc) of a property (e.g. color) to be selected by the print service provider 22. By doing so, the print service provider 22 will be determining which items will be available as potentially selectable items in a second user interface accessible by print buyers 24 (e.g. user interface 700 in FIG. 11). However, unlike the print service provider 22 that gets to select multiple items (100 gram, 80 gram, etc.) in a category or property (e.g. media weight), the print buyer 24 will be forced to pick just one of the available items (e.g. 100 gram, 80 gram, etc.) in a particular category or property because the print buyer 24 is building an actual print product such that the property (e.g. media weight) will have to be expressed via just one (e.g. 100 gram as shown at 742 in FIG. 11) of multiple possibilities.

In another example, instead of a print service provider 22 commercially selling print products to print buyers 24, the print service provider 22 is replaced by a corporate entity that offers print products to its internal customers, which take the role of the print buyer 24. In this scenario, the design tool service provider 85 exercises control via the first control parameter 780 to determine which properties are selectable by a manager of the corporate entity. Consequently, the second control parameter 782 is then exercised via the corporate manager to place restrictions on which properties are selectable by internal customers within the corporate structure. These restrictions can be cost-containment measures and/or dictate common style objectives within the corporate entity.

Figure 13:
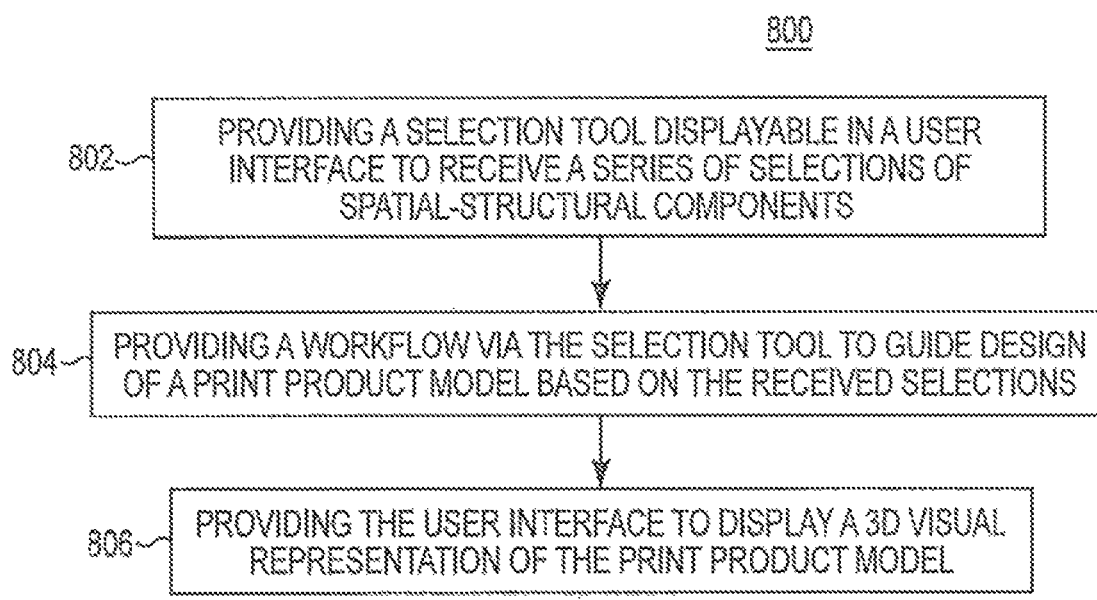
FIG. 13 is a flow diagram of a method of providing a print product design system, according to an example of the present disclosure.

FIG. 13 is a flow diagram of a method 800 of providing a print product design system, according to an example of the present disclosure. In one example, method 800 is performed using the components, modules, and systems previously described and illustrated in association with FIGS. 1A-10B. In other examples, method 800 is performed using components, modules, and systems other than those, previously described and illustrated in association with FIGS. 1A-10B.

As shown at 802 in FIG. 13, in one example method 800 includes providing a selection tool displayable in a user interface to receive a series of selections of spatial-structural components. In one example, the selections are made via menu of spatial-structural components for print products. In other examples, the selectable spatial-structural components are visible in the user interface via other formats. As shown at 804 in FIG. 13, method 800 further includes providing a workflow via the selection tool to guide design of a print product model based on the selections received via the user interface. At 806, the user interface is provided to display a three-dimensional (3D) visual representation of the print product model with the user interface incorporating each selected spatial-structural component into the visual representation generally simultaneous with a time of the selection.

In at least some examples of the present disclosure, a print product designer equips a print service provider to design a print product using a bottom-up approach in which the print service provider selects each component of the print product, as well as to set general parameters regarding their associated properties (e.g. color, media weight, quantity, etc). The print service provider is assured of achieving a high quality result via the print product designer (in accordance with examples of the present disclosure), which provides a workflow of selections of components of a print product, and via the display, which provides an ongoing visual representation of the print product model during its construction.

Accordingly, at least some examples of the present disclosure facilitate the print service provider to more easily design their own print products, thereby enhancing the print service provider's ability to directly offer a print buyer a wider variety of print products from which to choose. In some examples, via at least some examples of the present disclosure, the print service provider also is able to provide the print buyer the ability to customize some features of the offered print products.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein.

What is claimed is:

1. A non-transitory computer readable medium storing machine readable instructions to provide a user interface for designing a print product, the user interface comprising:

a display module to display a menu of selectable spatial-structural components for print products and a three-dimensional visual representation of an at least partially assembled print product, the spatial-structural components each comprising a portion of a print product model, the three-dimensional visual representation switchable within the display module among a first representation in which selected spatial-structural components of the print product are depicted in assembled form, a second representation in which the selected spatial-structural components of the print product are depicted in exploded form, and a third representation in which the selected spatial-structural components of the print product are depicted in partially exploded, partially assembled form; and a design module comprising:
 a component selector module cooperative with the display module to enable user selection of the spatial-structural components, the component selector module of the design module cooperatively enabling the user selection with the display module via the component selector module providing a workflow of selections of the spatial-structural components of the print product and the display module providing an immediate visual representation of the print product being built,
 wherein the design module causes each selected spatial-structural component to be incorporated into the three-dimensional visual representation simultaneously with the user selection,
 wherein the selected spatial-structural components as designed within the user interface is printed and assembled, creating an assembled print product.

2. The computer readable medium of claim 1, wherein the design module defines at least some spatial-structural components to comprise at least one behavioral parameter regarding how a respective one of the spatial-structural components behaves relative to at least some of the other respective spatial-structural components.

3. The computer readable medium of claim 2, wherein the design module defines at least one visualization parameter for at least some spatial-structural components that defines how the respective at least some spatial-structural components will appear in the three-dimensional visual representation.

4. The computer readable medium of claim 1, wherein the three-dimensional visual representation of the at least partially assembled print product comprises at least one spatial-structural component.

5. The computer readable medium of claim 1, wherein the design module comprises:
a selectable properties module to define a set of user-selectable properties for each respective spatial-structural component and wherein the display module causes display of the user-selectable properties for a currently selected spatial-structural component.

6. The computer readable medium of claim 5, wherein the design module comprises a control function having a first control parameter to control at least one of a quantity and a type of the selectable properties for the currently selected spatial-structural component and a second control parameter to define a subset of the respective number and type of properties controlled via the first control parameter.

7. The computer readable medium of claim 1, wherein in the third representation the selected spatial-structural components are depicted in partially exploded, partially assembled in that first spatial-structural components of the print product are displayed in exploded form and second spatial-structural components of the print product are displayed in assembled form.

8. The computer readable medium of claim 7, wherein the first spatial-structure components and the second spatial-structural components are aligned with one another along an axis corresponding to how the spatial-structural components are disposed relative to one another within the print product in assembled form.

9. The computer readable medium of claim 7, wherein the first spatial-structural components are aligned with one another along an axis corresponding to how the spatial-structural components are disposed relative to one another within the print product in assembled form, and wherein the second spatial-structural components are not aligned along the axis.

10. The computer readable medium of claim 1, wherein incorporation of each selected spatial-structural component into the three-dimensional visual representation simultaneously with the user select provides immediate feedback to the user regarding effectiveness and appearance of each spatial-structural component as part of the print product.

11. The computer readable medium of claim 1, wherein cost in creating the assembled print product is reduced by avoiding usage of a hardcoded template for the assembled print product.

12. The computer readable medium of claim 1, wherein the user interface lacks a separate behavior module account for a behavior of the spatial-structural components, the behavior of the spatial-structural components instead form part of a definition of the spatial-structural components, increasing effectiveness and speed of a bottom-up technique to create the assembled print product on a component-by-component basis.

13. A print product design system comprising:
at least one processor;
a memory device communicatively coupled to the processor;
a display module to display a menu of selectable spatial-structural components and a three-dimensional visual representation of a print product model that comprises at least one selected spatial-structural component, the spatial-structural components each comprising a structural portion of the print product model, the three-dimensional visual representation switchable within the display module among a first representation in which selected spatial-structural components of a print product are depicted in assembled form, a second representation in which the selected spatial-structural components of the print product are depicted in exploded form, and a third representation in which the selected spatial-structural components of the print product are depicted in partially exploded, partially assembled form;
a design module cooperable with the display module to guide design of the print product model via a workflow comprising a series of selections of the spatial-structural components in which each selected spatial-structural component is incorporated into the three-dimensional visual representation at the time of user selection, the design module cooperatively enabling the user selection with the display module via the design module providing the workflow of selections of the spatial-structural components of the print product and the display module providing an immediate visual representation of the print product being built; and
a first site, accessible via a network communication link, comprising a first user interface through the display module is accessible to design the print product model, wherein the selected spatial-structural components as designed within the first user interface is printed and assembled, creating an assembled print product.

14. The system of claim 13, wherein each spatial-structural component and a behavioral property of each respective spatial-structural component correspond to a production capability of a print service provider.

15. The system of claim 13, wherein the display module comprises a selectable properties input function to receive selections regarding properties of each spatial-structural component of the menu, wherein the properties comprise at least one of a dimensional parameter, a media weight parameter, a position parameter, a quantity parameter, and a color parameter.

16. The system of claim 13, comprising
a second site, accessible via the network communication link, comprising a second user interface to provide access to a catalog of a plurality of print product models designed via the design module and to receive selection and purchase of a print product model.

17. A method of providing a print product designer, the method comprising:
employing a non-volatile memory to store, and a processing resource to execute, machine readable instructions to cause:
providing a selection tool displayable in a user interface to receive a plurality of selections of spatial-structural components, each of the spatial-structural components comprising a portion of a print product model, a three-dimensional visual representation switchable within a display module among a first representation in which selected spatial-structural components of a print product are depicted in assembled form, a second representation in which the selected spatial-structural components of the print product are depicted in exploded form, and a third representation in which the selected spatial-structural components of the print product are depicted in partially exploded, partially assembled form;

providing a workflow via the selection tool to guide design of a print product model based on the received selections; and providing the user interface to display the three-dimensional visual representation of the print product model wherein the three-dimensional visual representation incorporates each selected spatial-structural component simultaneously with a time of the selection, wherein the selected spatial-structural components as designed within the user interface is printed and assembled, creating an assembled print product.

18. The method of claim 17, wherein the workflow is based on the design module by which at least some spatial-structural components define at least one behavioral parameter to specify a behavioral relationship between a respective one of the spatial-structural components and at least some of the other respective selectable spatial-structural components.

19. The method of claim 18, wherein the design module defines a visualization parameter, for at least some of the spatial-structural components, that defines how the spatial-structural component will appear, via the user interface, in the three-dimensional visual representation.

* * * * *